(12) United States Patent
Decker et al.

(10) Patent No.: US 11,486,761 B2
(45) Date of Patent: Nov. 1, 2022

(54) PHOTOTHERMAL INFRARED SPECTROSCOPY UTILIZING SPATIAL LIGHT MANIPULATION

(71) Applicant: Photothermal Spectroscopy Corp., Santa Barbara, CA (US)

(72) Inventors: Derek Decker, Santa Barbara, CA (US); Craig Prater, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 227 days.

(21) Appl. No.: 16/427,866

(22) Filed: May 31, 2019

(65) Prior Publication Data

US 2020/0378829 A1    Dec. 3, 2020

Related U.S. Application Data

(60) Provisional application No. 62/679,554, filed on Jun. 1, 2018.

(51) Int. Cl.
*G01J 3/02* (2006.01)
*G01J 3/10* (2006.01)

(52) U.S. Cl.
CPC ........... *G01J 3/0297* (2013.01); *G01J 3/0216* (2013.01); *G01J 3/0229* (2013.01); *G01J 3/108* (2013.01); *G01J 2003/102* (2013.01)

(58) Field of Classification Search
CPC ...... G01J 3/0297; G01J 3/0229; G01J 3/0216; G01J 3/108; G01J 2003/102
See application file for complete search history.

(56) References Cited

U.S. PATENT DOCUMENTS

| 2,940,355 | A | 6/1960 | Cary |
| 5,574,562 | A | 11/1996 | Fishman et al. |
| 6,532,070 | B1 | 3/2003 | Hovinen et al. |
| 7,630,081 | B2 | 12/2009 | Ressler et al. |
| 7,855,780 | B1 | 12/2010 | Djeu |
| 8,001,830 | B2 | 8/2011 | Dazzi et al. |
| 8,242,448 | B2 | 8/2012 | Prater et al. |
| 8,402,819 | B2 | 3/2013 | Dazzi et al. |
| 8,607,622 | B2 | 12/2013 | Dazzi et al. |
| 8,646,319 | B2 | 2/2014 | Prater et al. |
| 8,680,457 | B2 | 3/2014 | Maxik et al. |
| 8,793,811 | B1 | 7/2014 | Prater et al. |
| 8,869,602 | B2 | 10/2014 | Belkin et al. |
| 9,046,492 | B1 | 6/2015 | Prater |
| 9,091,594 | B2 | 7/2015 | Furstenberg et al. |

(Continued)

FOREIGN PATENT DOCUMENTS

CN       105699358 A    6/2016
DE    102014108424 B3   6/2015

(Continued)

OTHER PUBLICATIONS

Article "Helium-Neon Laser," University of New Mexico, dated Nov. 22, 2012 (Retrieved on May 4, 2018), 6 pages.

(Continued)

*Primary Examiner* — Christine S. Kim
(74) *Attorney, Agent, or Firm* — Patterson Thuente IP

(57) ABSTRACT

Apparatuses and methods for microscopic analysis of a sample using spatial light manipulation to increase signal to noise ratio are described herein.

30 Claims, 10 Drawing Sheets

(56) References Cited

U.S. PATENT DOCUMENTS

| | | |
|---|---|---|
| 9,134,341 B2 | 9/2015 | Prater et al. |
| 9,250,061 B2 | 2/2016 | Lorbeer et al. |
| 9,372,154 B2 | 6/2016 | Prater |
| 9,658,247 B2 | 5/2017 | Yang et al. |
| 9,841,324 B2 | 12/2017 | Furstenberg et al. |
| 10,228,388 B2 | 3/2019 | Prater et al. |
| 10,228,389 B2 | 3/2019 | Yang et al. |
| 10,241,131 B2 | 3/2019 | Prater |
| 10,473,693 B2 | 11/2019 | Yang et al. |
| 10,677,722 B2 | 6/2020 | Li et al. |
| 10,696,405 B2 | 6/2020 | Dowty et al. |
| 10,845,248 B1* | 11/2020 | Cheng ..................... G02F 1/125 |
| 10,942,116 B2 | 3/2021 | Prater et al. |
| 2002/0105641 A1 | 8/2002 | Anderson |
| 2004/0085540 A1 | 5/2004 | Lapotko et al. |
| 2004/0188602 A1 | 9/2004 | Chinn et al. |
| 2005/0105099 A1 | 5/2005 | Shpantzer et al. |
| 2008/0304046 A1 | 12/2008 | Lee et al. |
| 2009/0161092 A1* | 6/2009 | Zanni ..................... G01J 3/433 356/51 |
| 2009/0236528 A1 | 9/2009 | Shpantzer et al. |
| 2009/0249521 A1 | 10/2009 | Dazzi et al. |
| 2010/0044570 A1 | 2/2010 | McGill et al. |
| 2010/0079842 A1 | 4/2010 | Dunleavy et al. |
| 2010/0315646 A1 | 12/2010 | Chism, II |
| 2010/0320171 A1 | 12/2010 | Mao et al. |
| 2011/0122488 A1* | 5/2011 | Truong ............. G01N 21/6408 359/385 |
| 2011/0248166 A1 | 10/2011 | Diem et al. |
| 2012/0002030 A1 | 1/2012 | Kalkbrenner et al. |
| 2012/0026485 A1 | 2/2012 | Couston et al. |
| 2012/0122084 A1 | 5/2012 | Wagner et al. |
| 2012/0167261 A1 | 6/2012 | Belkin et al. |
| 2012/0314206 A1 | 12/2012 | Spizig et al. |
| 2013/0134310 A1 | 5/2013 | Furstenberg et al. |
| 2013/0162994 A1 | 6/2013 | Xie et al. |
| 2014/0009808 A1* | 1/2014 | Wang ..................... G03H 1/12 359/10 |
| 2014/0289912 A1 | 9/2014 | Andreev |
| 2014/0361150 A1 | 12/2014 | Cheng et al. |
| 2015/0085098 A1 | 3/2015 | Dowaki et al. |
| 2015/0219684 A1* | 8/2015 | Humphris ............. G01Q 20/02 850/1 |
| 2015/0285836 A1* | 10/2015 | Humphris ............. G01Q 10/00 850/1 |
| 2015/0308947 A1 | 10/2015 | Xu et al. |
| 2016/0011049 A1 | 1/2016 | Furstenberg et al. |
| 2016/0161245 A1* | 6/2016 | Fu ..................... G01B 11/24 250/208.2 |
| 2017/0127983 A1 | 5/2017 | Spegazzini et al. |
| 2017/0146455 A1 | 5/2017 | Mantele et al. |
| 2018/0007343 A1* | 1/2018 | Send ..................... H04N 13/271 |
| 2018/0052186 A1 | 2/2018 | Su et al. |
| 2018/0088041 A1 | 3/2018 | Zhang et al. |
| 2018/0156674 A1 | 6/2018 | Fleming et al. |
| 2018/0180642 A1 | 6/2018 | Shetty et al. |
| 2018/0246032 A1 | 8/2018 | Li et al. |
| 2018/0259553 A1 | 9/2018 | Yang et al. |
| 2018/0364158 A1* | 12/2018 | Wang ..................... G06K 9/2018 |
| 2019/0120753 A1 | 4/2019 | Prater et al. |
| 2019/0204230 A1 | 7/2019 | Ota |
| 2019/0317012 A1* | 10/2019 | Furstenberg ....... G01N 21/3563 |
| 2020/0025677 A1 | 1/2020 | Prater et al. |
| 2020/0217643 A1* | 7/2020 | Schnell ............... A61B 5/0066 |
| 2021/0003504 A1 | 1/2021 | Li et al. |

FOREIGN PATENT DOCUMENTS

| | | |
|---|---|---|
| WO | WO 2013/078471 A1 | 5/2013 |
| WO | WO 2018/102467 A1 | 6/2018 |

OTHER PUBLICATIONS

Article "Photothermal Lens Technique—Theory and Instrumentation," Swofford, 2015, 42 pages.

Bialkowski, "Application of the BaTiO3 Beam-Fanning Optical Limiter as an Adaptive Spatial Filter for Signal Enhancement in Pulsed Infrared Laser-Excited Photothermal Spectroscopy," Optics Letters, Sep. 1989, 3 pages.

Bialkowski, "Pulsed-Laser Excited Differential Photothermal Deflection Spectroscopy," Society for Applied Spectroscopy, 1992, 11 pages.

Bialkowski, "Ultrasensitive Photothermal Deflection Spectrometry Using an Analyzer Etalon," American Chemical Society, 1988, 6 pages.

Boyer et al., "Photothermal Imaging of Nanometer-Sized Metal Particles Among Scatters," Science, vol. 297, Aug. 2002, 4 pages.

Brandstetter et al., "High Power Terahertz Quantum Cascade Lasers with Symmetric Wafer Bonded Active Regions," Applied Physics Letters 103, 171113 (2013), 6 pages.

Burghoff et al., "Terahertz Laser Frequency Combs," Nature Photonics, 2014, 10 pages.

Cariou et al., "Refractive-Index Variations with Temperature of PMMA and Polycarbonate," Applied Optics vol. 25, No. 3, 1986.

Dowrey et al., Industrial Applications of Near-IR Imaging, Spectrochemical Analysis Using Infrared Multichannel Detectors, Blackwell Publishing, 2005, pp. 175-188.

Fournier et al., "Tomographic Approach for Photothermal Imaging Using the Mirage Effect," Journal of Physique Colloques, 1983, pp. C6-479-C6-482.

Furstenberg et al., "Chemical Imaging Using Infrared Photo-Thermal Microspectroscopy," U.S. Naval Research Laboratory, 2012, 10 pages.

Gaiduk et al., "Room-Temperature Detection of a Single Molecule's Absorption by Photothermal Contrast," Science, 2010, 4 pages.

Gorgulu et al. "All-Silicon Ultra-Broadband Infrared Light Absorbers," Scientific Reports, 2016, 7 pages.

Grodecki et al., "Optical Absorption and Raman Scattering Studies of Few-Layer Epitaxial Graphene Grown on 4H-SiC Substrates," Acta Phys. Pol. A 116.5 (2009); 835-837 (Year 2009).

Harada et al., "Photothermal Microscopy with Excitation and Probe Beams Coaxial Under the Microscope and its Application to Microparticle Analysis," 1993, 2938-2940.

Harthcock et al., Applications of Transmittance and Reflectance Micro/FT-IR to Polymeric Materials, Analytical Services, vol. 40, Issue 2, 1986, pp. 210-214.

Harthcock et al., Imaging with Functional Group Maps Using Infrared Microspectroscopy, Analytical and Engineering Sciences, vol. 42, Issue 3, 1988, pp. 449-455.

Hemming et al., "A High Power Mid-IR ZGP Ring OPO," with over 30 W of optical power (DOI: 10.1364/CLEO_SI.2013.CW1B.7).

Inoue et al., "Realization of Dynamic Thermal Emission Control," Kyoto University, Jul. 2014, pp. 928-931.

Jiang et al., "Compact High Power Mid-Infrared Optical Parametric Oscillator Pumped by a Gain-Switched Fiber Laser with Figure-of-h Pulse Shape," Optical Society of America, 2015, 6 pages.

Jiang et al., "Narrow-Linewidth Megahertz-Repetition-Rate Optical Parametric Oscillator for High-Speed Flow and Combustion Diagnostics", Applied Optics, vol. 47, No. 1, 2008, pp. 64-71.

Jung et al., "Infrared Broadband Metasurface Absorber for Reducing the Thermal Mass of a Microbolometer," Scientific Reports, 2017, 8 pages.

Kluk et al., "A High-Bandwidth, High-Precision, Two-Axis Steering Mirror with Moving Iron Actuator," Mechanical Engineering Department, Massachusetts Institute of Technology, 2010, pp. 552-557.

Lasne et al., "Label-Free Optical Imaging of Mitochondria in Live Cells," Optical Society of America, 2007, 10 pages.

Li et al., "Mid-Infrared Photothermal Imaging of Active Pharmaceutical Ingredients at Submicrometer Spatial Resolution," Anal. Chem., 89, 2017, 4863-4867.

Li et al., "Super-Resolution Far-Field Infrared Imaging by Photothermal Heterodyne Imaging," The Journal of Physical Chemistry B, 2017, 8838-8846.

(56) References Cited

OTHER PUBLICATIONS

Li et al., "Super-Resolution Imaging with Mid-IR Photothermal Microscopy on the Single Particle Level," SPIE Proceedings vol. 9549, 954912-18, 2015, 8 pages.

Li et al., "Super-Resolution Mid-Infrared Imaging Using Photothermal Microscopy," Conference on Lasers and Electro-Optics, Optical Society of America, San Jose, California, 2016, p. ATu3J7.

Liu, "Differential Interference Contrast-Photothermal Microscopy in Nanospace: Impacts of Systematic Parameters," Journal of Microscopy, Mar. 2017, 9 pages.

Marcott et al., "Mining the Information Content Buried in Infrared and Near-Infrared Band Shapes by Temporal, Spatial, and Other Perturbations," Applied Spectroscopy, 2009, 9 pages.

Mertiri et al., "Label Free Mid-IR Photothermal Imaging of Bird Brain with Quantum Cascade Laser," CLEO: Applications and Technology, Optical Society of America, 2014, p. AF1B 4.

Mertiri et al., "Nonlinear Midinfrared Photothermal Spectroscopy Using Zharov Splitting and Quantum Cascade Lasers," ACS Photonics, 2015, 7 pages.

Mertiri et al., "Mid-Infrared Photothermal Heterodyne Spectroscopy in a Liquid Crystal Using a Quantum Cascasde Laser," Applied Physics Letters, 101, 2012, 4 pages.

Moscatelli, "Tiny Lenses for Miniature Devices," Scientific American, Dec. 2019, 1 page.

Peng et al., High-Power Mid-Infrared Tunable Optical Parametric Oscillator Based on 3-mm-Thick PPMgCLN[1], Institute of Applied Electronics, China Academy of Engineering Physics, 2012, pp. 87-90.

Sander, "Mid-Infrared Photothermal Imaging," Laser Science, Optical Society of America, 2015, p, LM1I.

Selmke et al., "Photothermal Single Particle Microscopy: Detection of a Nanolens," ACS Nano, 2011, 11 pages.

Stolyarov et al., "Photothermal Speckle Modulation for Noncontact Materials Characterization," Opt. Lett., 40, 24, 2015, 5786-5789.

Sullenberger et al., "Spatially-Resolved Individual Particle Spectroscopy Using Photothermal Modulation of Mie Scattering," Massachusetts Institute of Technology, vol. 42, No. 2, Jan. 15, 2017, pp. 203-206.

Tapos et al., "High Bandwidth Fast Steering Mirror," Optomechanics, 2005, 14 pages.

Wang et al., "High-Power Terahertz Quantum Cascade Lasers with~0.23 W in Continuous Wave Mode," AIP Advances, 2016, 6 pages.

Webpage—Optotronics—https://www.optotronics.com/532nm-green-laser-systems.php, 2017, 2 pages.

Winefordner et al., "Comparison of Calculated Detection Limits in Molecular Absorption, Molecular Luminescence, Raman, Molecular Ionization, and Photothermal Spectroscopy," Applied Spectroscopy, vol. 39, No. 3, 1985, 15 pages.

Zanuto, "Analysis of the Thermo-Reflectivity Coefficient Influence Using Photothermal Pump-Probe Techniques," Applied Spectroscopoy, 2016, 7 pages.

Zhao, "Heterogeneous and Cross-Distributed Metal Structure Hybridized with Mos2 as High-Performance Flexible SERS Substrate," School of Physics and Electronics, Sep. 2018, 13 pages.

Callaway, "It Opens up a Whole New Universe: Revolutionary Microscopy Technique See Individual Atoms for First Time," Nature, vol. 582, Jun. 11, 2020, 2 pages.

Cho Pak et al., "Investigation of Standoff Explosives Detection Via Photothermal/Photoacoustic Interferometry," Chemical, Biological, Radiological, Nuclear, and Explosives Sensing XII, vol. 8018, No. 1, May 13, 2011, 15 pages.

Totachawattana et al. "Optimization of Mid-IR Photothermal Imaging for Tissue Analysis," Visual Communications and Image Processing, Aug. 26, 2015, 7 pages.

Nedosekin et al., "Photothermal Confocal Spectromicroscopy of Multiple Cellular Chromophores and Fluorophores," Biophysical Journal, Feb. 1, 2012, 10 pages.

Zhang et al., "Depth-Resolved Mid-Infrared Photothermal Imaging of Living Cells and Organisms with Submicrometer Spatial Resolution," Science Advances, Sep. 28, 2016, 8 pages.

Application and file history for U.S. Appl. No. 14/748,430, filed Jun. 24, 2015. Inventors: Furstenberg et al.

Application and file history for U.S. Appl. No. 15/715,534, filed Sep. 26, 2017. Inventors: Zhang et al.

Application and file history for U.S. Appl. No. 15/826,147, filed Nov. 29, 2017. Inventors: Shetty et al.

Application and file history for U.S. Appl. No. 16/155,089, filed Oct. 9, 2018. Inventors: Prater et al.

Application and file history for U.S. Appl. No. 16/702,094, filed Dec. 3, 2019. Inventors: Prater et al.

Application and file history for U.S. Appl. No. 16/877,152, filed May 18, 2020, Inventors: Li et al.

Application and file history for U.S. Appl. No. 15/480,218, filed Apr. 5, 2017, Inventors: Li et al.

* cited by examiner

PHOTOTHERMAL INFRARED SPECTROSCOPY UTILIZING SPATIAL LIGHT MANIPULATION

RELATED APPLICATION

This application claims the benefit of U.S. Provisional Application No. 62/679,554 filed Jun. 1, 2018, which is hereby fully incorporated herein by reference.

TECHNICAL FIELD

This disclosure relates to investigating or analyzing materials by the use of optical means, i.e. using infra-red, visible or ultra-violet light.

BACKGROUND

This disclosure is related to infrared spectroscopy and imaging with spatial resolution down to the sub-micron scale using an optical photothermal detection technique. Some optical photothermal techniques have been described in U.S. Pat. Nos. 9,091,594 and 9,841,324, for example. These references often refer to the technique by different names and acronyms. For the purposes of this application, we will refer to these techniques collectively and, in this application, as Optical Photothermal Infrared (OPTIR).

Several research groups have worked in this general field of OPTIR, including researchers at Naval Research Laboratory, Purdue University, Notre Dame University, Boston University, and the Massachusetts Institute of Technology. Instruments developed in these labs use visible light beams to probe the photothermal response of samples in response to absorption of infrared radiation. Potentially relevant background publications and patents include: (1) R. Furstenberg, C. Kendziora, N. D. Bassim, R. A. McGill, and V. K. Nguyen, U.S. Pat. No. 9,091,594 B2 (2015); (2) C. Li, D. Zhang, M. N. Slipchenko, and J.-X. Cheng, Anal. Chem., 89, 9, 4863-4867 (2017); (3) D. Zhang, C. Li, C. Zhang, M. N. Slipchenko, G. Eakins, and J.-X. Cheng, Science Advances, 2, 9, e1600521 (2016); (4) Z. Li, K. Aleshire, M. Kuno, and G. V. Hartland, The Journal of Physical Chemistry B, 121, 37, 8838-8846 (2017); (5) Z. Li, M. Kuno, and G. Hartland, "Super-resolution imaging with mid-IR photothermal microscopy on the single particle level", in SPIE Nanoscience+ Engineering (International Society for Optics and Photonics, 2015), p. 954912-954912-954918; (6) Z. Li, M. Kuno, and G. Hartland, "Super-resolution Mid-infrared Imaging using Photothermal Microscopy", in Conference on Lasers and Electro-Optics (Optical Society of America, San Jose, Calif., 2016), p. ATu3J.7.; (7) A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4; (8) M. Y. Sander, "Mid-infrared photothermal imaging", in Laser Science (Optical Society of America, 2015), p. LM1I. 2; (9) U.S. Pat. No. 9,091,594 B2, entitled "Chemical mapping using thermal microscopy at the micro and nano scales," assigned to the U.S. Secretary of Navy.

There are also devices that have been constructed using off axis illumination and camera sensors to detect photothermal modulation of laser speckle, as discussed, for example, in A. M. Stolyarov, R. M. Sullenberger, D. R. Crompton, T. H. Jeys, B. G. Saar, and W. D. Herzog, Opt. Lett., 40, 24, 5786-5789 (2015), as well as variations in light scattering, as discussed, for example, in R. M. Sullenberger, S. M. Redmond, D. Crompton, A. M. Stolyarov, and W. D. Herzog, Opt. Lett., 42, 2, 203-206 (2017). These approaches, however, are not suitable for microscopy applications for sub-micron dimensions because of focal length/numerical aperture limitations placed on sample imaging optics.

A key limitation in the prior art of photothermal imaging and spectroscopy is that the photothermal effect due to IR absorption can be quite small. For example, the total intensity modulation in collected probe light due to absorption of IR radiation by the sample can be three to six orders of magnitude less than the average intensity of the total collected probe light. Because of this, it can be a challenge to detect small absorptions of IR radiation, either from weakly absorbing samples, samples with weak photothermal responses, and/or microscopically small amounts of sample material. Increasing the measurement time to accomplish orders of magnitude increases in precision is often not practicable. Measurement precision increases proportional to the square root of the sampling time, however, and so increasing the precision of an OPTIR detector by increasing sampling time is limited as a practical matter because achieving, for example, one order of magnitude improvement in precision requires sampling times to be increased by a factor of 100.

SUMMARY

According to embodiments described herein, an apparatus for rapidly characterizing a sample with infrared radiation on a submicron scale is described. The apparatus can include a source of infrared radiation, a source of probe radiation, and a collector configured to collect probe light that has interacted with a region of the sample that has also interacted with the probe radiation. The apparatus can also include a spatial light manipulator configured to alter a distribution of collected probe light incident on a detector configured to detect at least a portion of collected probe light. The source of infrared radiation and the source of probe radiation are configured such that the infrared illuminated area can interact with a sample to affect the detected probe light.

The source of infrared radiation can be configured to illuminate a sample with a beam of infrared radiation to create an infrared illuminated area. The source of probe radiation configured to illuminate a sample with a beam of probe radiation to create a probe illuminated area. The collector can be configured to collect as collected probe light at least a portion of probe radiation that has interacted with the sample. The detector can be configured to detect as detected probe light at least a portion of collected probe light and generate at least one signal indicative of the portion of collected probe light. At least one spatial light manipulator can be configured to alter a distribution of collected probe light incident on the at least one detector, and the at least one detector signal can be used to generate a signal indicative of an absorption of infrared radiation of at least a portion of the region of the infrared illuminated area. The source of infrared radiation and the source of probe radiation can be configured such that the infrared illuminated area can interact with a sample to affect the detected probe light.

The above summary is not intended to describe each illustrated embodiment or every implementation of the subject matter hereof. The figures and the detailed description that follow more particularly exemplify various embodiments. This disclosure is related to novel instruments and methods that improve the signal strength and reduce the noise and unwanted background for measurements of IR absorption on the microscopic scale.

BRIEF DESCRIPTION OF THE DRAWINGS

Subject matter hereof may be more completely understood in consideration of the following detailed description of various embodiments in connection with the accompanying figures, in which.

Figure 1:
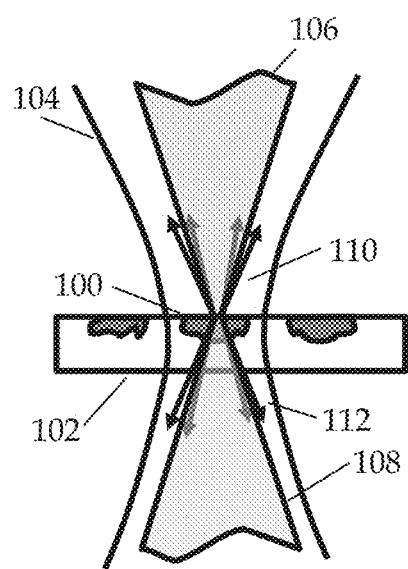
FIG. 1 shows a simplified schematic diagram of the photothermal principle employed by optical photothermal infrared (OPTIR) spectroscopy and imaging.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

This specification described methods and apparatuses for performing optical photothermal infrared (OPTIR) imaging and spectroscopy with improved sensitivity, improved signal-to-noise ratio, and decreased background signal. By using pixilated beam splitting or blocking, data that are more reliable and have increased signal-to-noise ratios can be selected or weighted more heavily than data from pixels that impart noisy or unreliable data.

Several definitions are provided below for phrases that are used throughout the application.

"Illuminating" means to direct radiation at an object, for example a surface of a sample. Illumination may include any arbitrary configuration of radiation sources, pulse generators, modulator, reflecting elements, focusing elements and any other beam steering or conditioning elements.

In the context of light "interacting" with a sample, the word "interacting" means that light illuminating a sample is at least one of scattered, refracted, absorbed, aberrated, diverted, diffracted, transmitted, and reflected by, through and/or from the sample.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), nanosecond, picosecond, femtosecond, and attosecond laser systems, CO2 lasers, microscopic heaters, and/or any other source that produces a beam of radiation. The source emits infrared radiation in a preferred embodiment, but it can instead or also emit in other wavelength ranges, for example from ultraviolet to THz. The source may be narrowband, for example with a spectral width of <10 cm-1 or <1 cm-1 less, or may be broadband, for example with a spectral width of >10 cm-1, >100 cm-1 or greater than 500 cm-1.

"Probe beam" is a beam of light that is directed onto a sample to detect a photothermal distortion or other optical distortion resulting from the interaction of IR radiation with the sample, for example to detect the absorption of IR radiation by the sample.

"Source of probe radiation" refers to a radiation source that produces a probe beam. The Source of probe radiation will generally produce a probe beam comprising one or more emission wavelengths generally within the wavelength range from the visible to ultraviolet, but it may also or instead generate radiation at shorter or longer wavelengths, for example in the near-IR, extreme-UV or even x-ray range. The source of probe radiation may comprise a gas laser, a laser diode, a diode pumped solid state laser, a superluminescent diode (SLD), a UV and/or visible laser beam generated via sum frequency or difference frequency generation, for example, or any other source of laser of other coherent radiation. It may also comprise an incoherent source, for example an incandescent source, a light emitting diode or other light source. In a one embodiment it may also comprise any or other sources of UV and/or visible light that can be focused to a spot on the scale smaller than 2.5 micrometer, and preferably smaller than 1 micrometer.

"Spectrum" refers to a measurement of one or more properties of a sample as a function of wavelength or equivalently (and more commonly) as a function of wavenumber.

"Optical property" refers to an optical property of a sample, including but not limited to index of refraction, absorption coefficient, reflectivity, absorptivity, scattering, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection, and/or scattering of light or other response of a material due to the interaction with illuminating radiation.

"Spatial light manipulator" is a pixel addressable device that can selectively alter at least one of the intensity, phase, and/or angle of different regions of a light beam. A spatial light manipulator can comprise for example it may be a digital micromirror device, liquid crystal on silicon (LCOS) device, a twisted nematic liquid crystal display (TN-LCD), Ferroelectric Liquid Crystal on Silicon (FLCoS), arrays of minute interferometers, wavefront control devices (including electrostatically manipulated membranes, arrays of piezo-driven actuators, electro-optic material like liquid crystals sandwiched by transparent electrode arrays and dynamic arrays of holographic elements which are controlled with electricity, mechanical means or optical patterns generated sequentially or in parallel. An array of gratings can control the intensity and direction of regions (pixels within the array) by diffracting portions of coherent light in different directions with gratings which can be rotated and intensity modulated controlling phase, amplitude, and/or blaze amplitudes). Additional methods to perform SLM may include surfaces or volumes that change their optical properties (reflection, transmission, absorption, or scattering) as a function of a light pattern. The SLM can also be any other device that can alter the intensity, phase, polarization, and/or angle of a light beam with pixel-level control. The spatial light manipulator may be a binary device, i.e. each pixel may be in an on or off state, and/or it may be a multi-level/gray scale device. In a multi-level/gray scale device, for example, the SLM may attenuate the light beam by a variable amount per pixel, or in the case of an angle actuated device, deviate the beam over more than two angles.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "scanner" is one or more scanning mechanisms used to generate relative translation between the probe and the sample so that the probe can interact with and measure properties of a plurality of positions on a sample. The scanning mechanism can move either the probe, the sample or a combination thereof. The scanning mechanisms are usually piezoelectric devices, but can also employ other mechanisms like electromagnetic, electrostatic, electrostrictive, and other drive mechanisms that induce a desired motion in response to a given control signal or command. Scanners include, but are not limited to piezoelectric tubes, piezoelectric stacks, piezoelectric driven flexure stages, voice coils, and other mechanisms for providing precision translation.

A "controller" refers to a system to facilitate data acquisition and control of the system. The controller may be a single integrated electronic enclosure or may comprise multiple distributed elements. The control elements may provide control for positioning and/or scanning of the probe, illumination, and/or sample. They may also collect data about the probe modulation, profile motion or other response, provide control over the radiation source power, polarization, modulation, steering, focus and/or other functions. The control elements may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, field programmable gate arrays or other circuit elements. A memory configured to store computer programs may be implemented along with discrete circuit components to carry out one or more of the processes described herein. We also recognize and expect advances in computing could be useful, including but not limited to, quantum devices (qbits), photonic circuits, and molecular electronics. We also recognize and expect useful advances in software, including but not limited to, genetic algorithms, neural networks, GPU TensorFlow and other artificial intelligence and deep machine learning methods.

A "lock-in amplifier" is a device and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, microcontrollers, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Detector" refers to an optical detector that generates a signal indicative of a quantity of light incident on the detector. A detector can generate a charge, a photocurrent, a voltage, or other signal in response to light incident on the detector. The detector can comprise one or more different technologies, including semiconducting photodiodes, for example made of materials including but not limited to silicon, germanium, indium gallium arsenide, indium gallium arsenide phosphide or related materials. The detector may comprise a PN photodiode, PIN photodiode, an avalanche photodiode, a Schottky photodiode, a photomultiplier tube, or any other kind of optical sensor that produces a signal in response to light incident on it.

FIG. 1 depicts an OPTIR imaging system. OPTIR systems can be used to detect sample characteristics at a microscopic level. Other similar systems are described in copending PCT patent application PCT/US17/63807, for example, the disclosure of which is incorporated by reference in its entirety. A region 100 of a sample 102 is illuminated with a beam of infrared radiation 104, causing a temperature rise, i.e. a photothermal response, in IR absorbing regions of a sample. To measure the photothermal response resulting from the IR absorption, at least a portion of the IR absorbing regions are also illuminated with a beam of probe radiation 106. In the configuration shown, this probe beam 106 is then reflected back along the illuminating path, and/or transmitted (108) through the sample. Both reflected and transmitted portions are indicated with arrows in FIG. 1, in addition to the illustrations of the beam waists showing the focused probe radiation 106. The change in temperature of the IR illuminated sample and/or surroundings (such as the air or fluid above or surrounding the sample) from IR absorption of the sample causes a change in the phase, polarization, intensity and/or angles of light reflected/scattered (110) from the sample, and/or the phase/polarization/intensity/angles of the light transmitted (112) through the IR absorbing regions. By measuring fluctuations in collected probe light it is possible to create a signal indicative of the absorption of IR light by the absorbing regions of the sample. In the configuration shown, probe light is collected in a reflected configuration, but measurements can similarly be performed in transmission and scattering configurations.

In many conventional systems, the probe beam can comprise a beam of visible and/or ultraviolet light, i.e. a wavelength that is significantly shorter than the IR light. The reason for the use of UV or visible light is that the shorter wavelengths of UV/visible light allows it to be focused to a much smaller spot than the IR radiation. As such it can be used to measured IR absorption with spatial resolution a factor of 10× or more smaller than with conventional IR microscopy. To prevent loss of spatial resolution due to thermal diffusion, brief pulses of IR illumination (on the order of hundreds of nanoseconds or less) are combined with synchronous detection schemes.

The signal indicative of IR absorption can be measured as a function of the wavelength of IR radiation to generate IR absorption spectra and the IR absorption signal can be measured as a function of relative sample position to generate spatially resolved maps of chemical composition of the sample. Spatially resolved maps can be created by measuring IR absorption at select wavelengths (or equivalently wavenumbers) as a function of sample position, and/or entire IR absorption spectra can be measured at multiple locations on a sample. In this case of so-called hyperspectral imaging, the data cube has transverse dimensions x and y along the sample surface while the third dimension comprises IR absorption spectra which is used to identify molecules by their excitation modes (stretching, bending, twisting, etc.). An example of such a data cube is shown at FIG. 21 of PCT/US17/63807, which was incorporated by reference in its entirety above.

A key limitation in the prior art of photothermal imaging and spectroscopy, however, has been the fact that the photothermal effect due to IR absorption can be quite small. For example, the total intensity modulation in collected probe light due to absorption of IR radiation by the sample can be in the range of 1E-3 to 1E-6 (or less) of the average intensity of the collected probe light. Because of this, it can be a challenge to detect small absorptions of IR radiation, either from weakly absorbing samples, samples with weak photothermal responses, and/or microscopically small amounts of sample material.

The current specification outlines techniques to overcome some of these limitations. The fundamental concept introduced here is the use of a dynamically programmable spatial light manipulator (SLM) to preferentially select portions of the collected probe light beam that maximally contribute to the signal indicative of IR absorption, and preferentially reject portions of the collected probe light that substantially contribute to a static background, thus primarily contributing to noise instead of signal.

Figure 2:
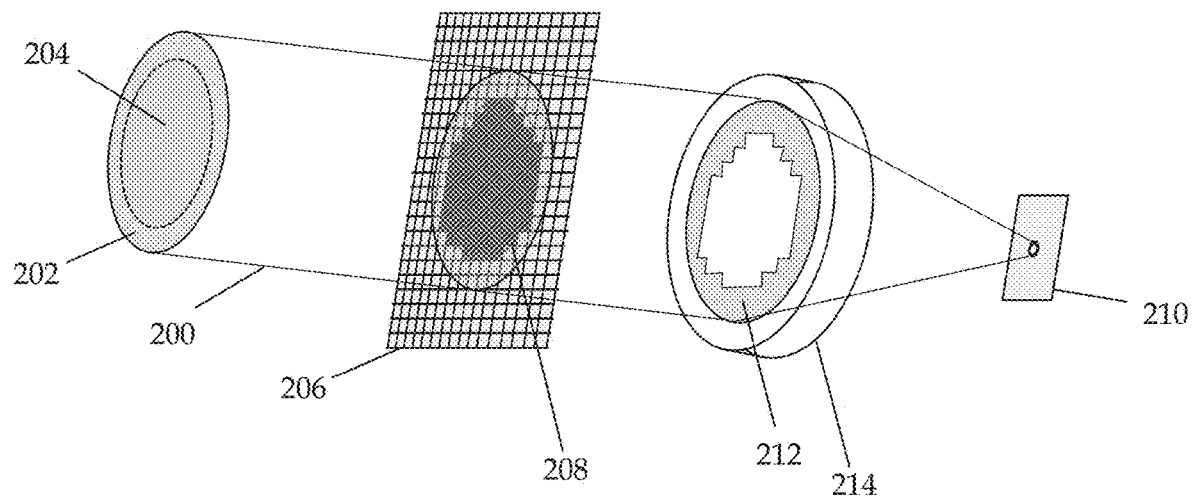
FIG. 2 is a simplified schematic diagram of a spatial light manipulator in an embodiment of an OPTIR system

FIG. 2 conceptually illustrates a key idea behind the current invention. FIG. 2 shows a probe beam 200 that has been collected after interacting with a region of the sample. The intensity and/or angles of the beam have been affected by the temperature rise from the IR absorption of absorbing regions of the sample. There are portions of the beam, for example annulus 202 that may have larger fluctuation in beam intensity and/or angle than other regions of the beam, for example central region 204. The beam 200 is incident on a spatial light manipulator 206 that comprises an array of pixels that can be selectively turned into an on state or an off state. The example shown in FIG. 2 is a transmissive configuration, i.e. where pixels of spatial manipulator 206 (shown as a grid pattern 208 of pixels) in the on state allow transmission of the light, whereas pixels in the off state, block the transmission of light. Some Spatial Light Manipulators (SLMs) can be used in a reflective configuration, where the on state reflects light along a path towards a detector and whereas the off state directs the light elsewhere, such as a beam dump or even another detector used in a differential detection scheme. After being transmitted through the SLM 206 or being reflected by the SLM (configuration not shown), the beam can then be incident on the detector 210, optionally focused by focusing element 214. The pattern 212 of light projected on the detector reflects the pattern 208 of pixels that are on or off in the SLM. In effect, the pattern 212 created by the SLM acting as a mask permits only the portion of probe light that is most sensitive to sample IR absorption to reach the detector. In the example shown, the pattern on the SLM is a simple obscuration that blocks the central portion of the circular probe beam. Optional focusing element 214 may include any number of lenses, mirrors, hologram, gradient index medium, or other focusing devices or assemblies.

The patterns can be specifically chosen to improve (or ideally substantially optimize) a figure of merit associated with the signal indicative of the sample IR absorption. The figure of merit for example could be the strength of the IR absorption signal, the intensity of the noise and/or background, and/or the signal to noise ratio or the signal to background ratio of the IR absorption signal. Note that the term "improving" may mean increasing or decreasing, depending on the specific figure of merit. For example, it is desirable to maximize the signal strength, the signal to noise ratio and signal to background ratio. But if the figure of merit selected is the intensity of the noise and/or background, improving these figures of merit would involve minimizing one or both of the noise and/or background intensity. In one embodiment it is desirable optimize the signal to noise ratio by maximizing the sensitivity of the signal indicative of the IR absorption, while simultaneously substantially minimizing the amount of unchanging background light that contributes more noise than signal to the IR absorption signal. In general, improving a figure of merit corresponds with providing more precise, less noisy data indicative of the response of the sample to an IR beam.

The SLM patterns can be programmed parametrically. For example, the SLM pattern may comprise an annulus of pixels in an on state, with all other pixels in an off state. The inner and outer diameters of the annulus can be programmatically controlled. These radii can be dynamically adjusted in the pattern while monitoring the IR absorption signal strength, signal to noise ratio or other similar performance metric. The system can automatically adjust the parameters of the SLM pattern, e.g. the annulus radii until the signal strength, SNR or other similar metric is substantially maximized, and/or the noise and/or background are substantially minimized. The SLM pattern can also be a series of concentric annuli, e.g. like a bullseye pattern. This shape can be advantageous for accommodating circular diffraction patterns.

Figure 3A:
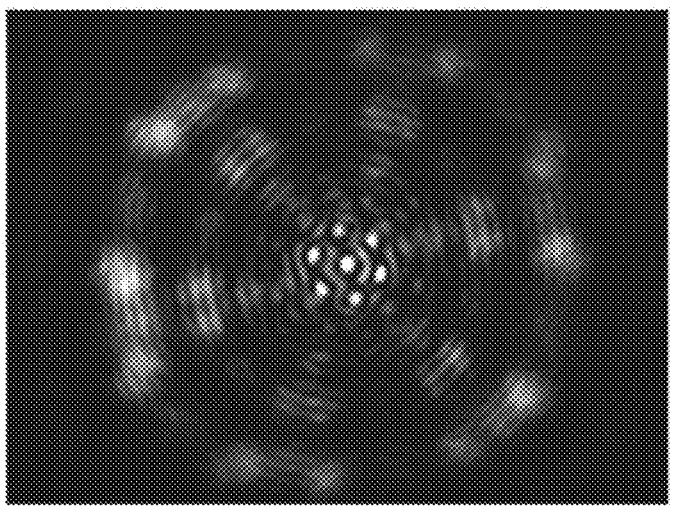
FIGS. 3A, 3B, and 3C are an example of distribution of the photothermal response of probe light collected after interacting with an IR absorbing sample.
Figure 3B:
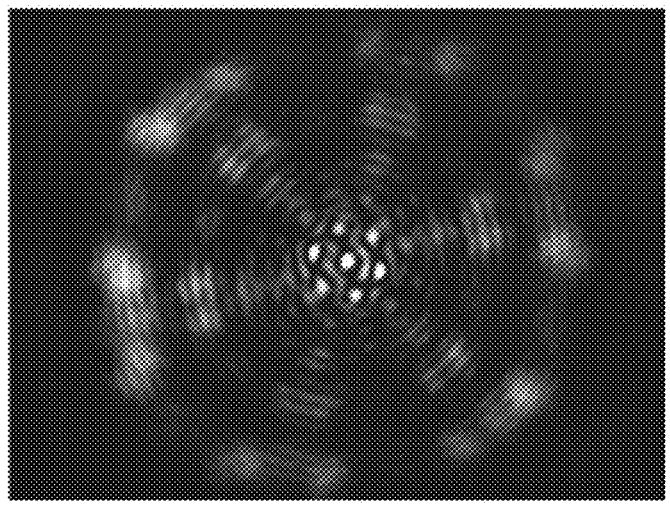
Figure 3C:
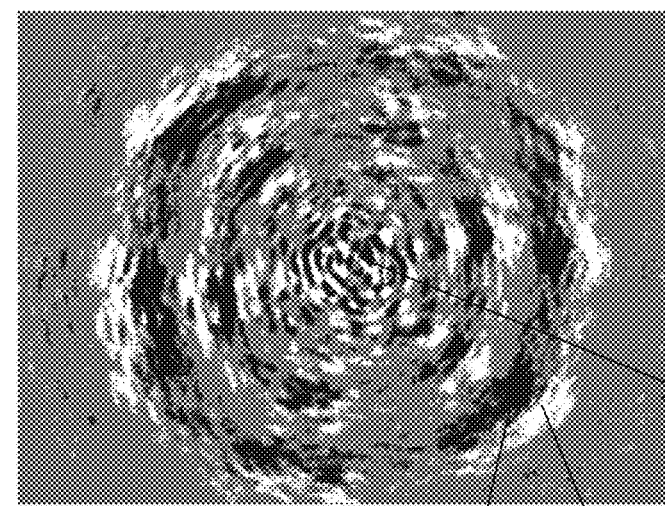

The SLM patterns may also be arbitrarily complex. Especially in the presence of scattering, speckle, and/or diffraction effects, the pattern of light intensity and angle change can be extremely complex. FIG. 3A and FIG. 3B illustrate this issue and represent the pattern of 532 nm probe light scattered/reflected from a polymer film sample and collected in an OPTIR experiment. These images were obtained by placing a camera in the collected Probe light path capturing camera frames with the IR light beam off the sample (FIG. 3A), with the IR light illuminating the sample (FIG. 3B). Note the complex distribution of light resulting from effects including shadows from the Cassegrain style objective used, scatter/speckle from the sample and other surface, and diffraction effects. Note also that the changes between FIGS. 3A and 3B are subtle and hard to discriminate. To better illustrate the effects of the IR absorption, FIG. 3C shows an example difference image between FIG. 3B (IR on) and FIG. 3A (IR off). FIG. 3C is rendered to show three types of regions: (1) regions with minimal difference between IR on and off are shaded gray (e.g. regions 300 and 302); (2) regions with an increase in detected probe light with IR absorption are shaded white (e.g. regions 304 and 306); (3) regions with a decrease in detected probe light with IR absorption are shaded black (e.g. regions 308 and 310). The regions that are gray, including (300) and (302), in FIG. 3C represent near zero difference, even though the intensities range from bright (300) to dark (302) in the original images (the corresponding points in FIG. 3A and FIG. 3B). White regions in the image represent areas of the probe beam that increased in intensity with the IR light on, whereas black regions represent areas where the intensity of probe light decrease with the IR light on. Note that the black areas still represent a measurable change in probe intensity with IR absorption, the sign of the change of the black regions is just opposite that of the white regions.

To maximize the IR absorption signal, it is desirable to program a pattern on the SLM that follows the regions of highest signal sensitivity, i.e. the regions with the largest net change between IR light on and IR light off. So, for example, to improve the signal to noise ratio of the IR absorption signal, the SLM can be programmed to select pixels that correspond to regions of the probe beam that show a significant change in intensity between IR on and IR off conditions. For example, this can represent selecting the white regions of FIG. 3C, the dark regions of FIG. 3C, or a combination thereof.

Figure 4:
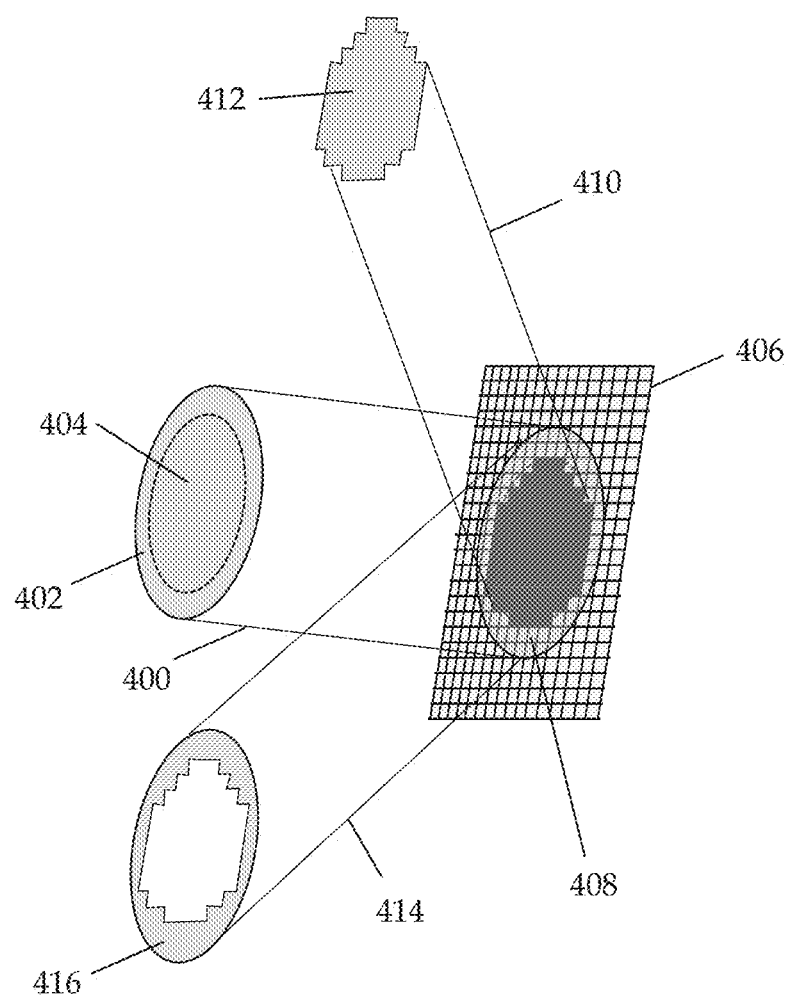
FIG. 4 illustrates one method of separating a collected probe beam into two sub-beams in an OPTIR system using a spatial light manipulator to deflect separate regions of the beam in different directions.

FIG. 4 shows an alternate embodiment where the SLM is used to direct different portions of the probe beam to two different detectors. It has been noted that certain regions of the probe light increase in intensity, while other regions correspondingly decrease in response to absorption of IR light by a sample. To maximize the sensitivity of the IR absorption signal, it can be desirable to separate out these regions based on the sign of the change. For example, regions that are increasing in response to IR absorption can be sent to one detector and regions that are decreasing in response to IR radiation can be sent to a second detector. By adding, subtracting or otherwise comparing the signals at the two detectors, it is possible to create a signal that is enhanced compared to a single detector. FIG. 4 shows a beam of probe radiation 400 after having interacted with the sample, with different regions 402 and 404 that react with opposite sign to absorption of IR radiation by the sample. The two regions are shown as simple shapes, an outer annulus 402, and a center circular region 404 just for simplicity in this illustration. In practice, the patterns may be extremely complex, for example similar to the pattern shown in FIG. 3C. The light beam 400 is incident on SLM 406 which has a large array of addressable pixels 408 that can be used to reflect or transmit light incident on the pixels to two or more different angles. In the illustration shown in FIG. 4, a pattern of pixels 408 is selected to be in a first state that reflects a portion 410 of beam 400 incident on the SLM on a first path that can be directed to a first detector (not shown). The cross-section of the beam reflected on the first path is illustrated by shaded region 412. A complementary set of pixels are set in a second state to direct a second portion of the beam 414 to an alternate angle, the cross-section of beam portion 414 shown by shaded region 416. Beams 410 and 414 can be directed to two separate detectors (not shown) to create a differential measurement of the relative light increases and decreases in response to IR absorption by the sample. Note that in FIG. 4, a reflective configuration is shown, i.e. where both beams are reflected along two different angles. Alternate embodiments can have one beam reflected and the other beam transmitted, for example.

In another embodiment, using one or more SLMs, detectors can be used to detect the movement of light. An example of such a system would be to precisely track the fringe shift of an interferometric system. In this case, SLM patterns can be aligned for example to interferometric fringes in the condition of IR light off. When the IR light pulses are turned on creating deformation in the sample surface and/or phase changes in the collected probe light, the interferometric fringes will move relative to the SLM pattern. This will convert a change in fringe location to a change in intensity at the detector. Using multiple detectors, it is possible to convert the measurements of detector intensity change into a measurement of fringe movement. Similar techniques can be used to detect radial shifts of energy of diffraction rings or diameter of a spot size.

As can be seen from the above discussion, the incorporation a programmable SLM device into the collected beam path allows the instrument to efficiently select between portions of the probe beam that have high/low and/or positive/negative sensitivity. This approach has a significant advantage over previous approaches. For example, a group at MIT has employed video cameras to capture the pattern of visible light scattered from an IR illuminated sample. They have used calculations based on the camera pixel intensities to determine a signal indicative of IR absorption by the sample. While this approach does allow analysis of a complicated distribution of visible light scattered from the sample, the approach also has significant limitations. Camera sensors such as those used in the MIT work often have significant limits with respect to at least one of frame rate, read noise, and dynamic range. For example, most cameras can only read out full frames continuously at rates in the tens to hundreds of frames per second. Cameras that can operate at higher frame rates often have unacceptably high read noise. Most cameras also have issues with dynamic range, bracketed by limited pixel well depth on the high end and read noise on the low end. This limited dynamic range can make it a challenge to detect small variations in signal intensity such as the small variations in probe signal intensity due to absorption of IR radiation by the sample.

The approach in the current specification maintains the advantages of the camera-based approach but eliminates many of its limitations. Specifically, since the SLM directs the light to one or more discrete detectors, not a camera array, the current approach is not limited by camera frame rate, dynamic range or the computational burden of image processing. Discrete photodetectors or few element photodetector arrays can easily operate in the MHz or even GHz regimes, allowing readouts many orders of magnitude faster than using a camera sensor. Further, discrete photodetectors can have much larger dynamic ranges. While camera sensor dynamic range is limited by the well depth, i.e. the maximum amount of photoelectrons that can be stored per pixel before readout, discrete photodiodes can be read out continuously, e.g. by continuously sampling the instantaneous photocurrent generated in a photodiode. Photodetector dynamic range can also be adaptive to the level of collected light. For example, a photodetector (or photodetector array) may be connected to one or more pre-amplifiers, for example transimpedance amplifiers and/or other signal conditioning electronics can have variable gain to adjust the amount of gain to match the intensity of the probe light reaching the detector(s). The combination of pixel level masking control from the SLM and the high measurement bandwidth and high dynamic range provide a significant benefit versus the camera-based approach.

Figure 5:
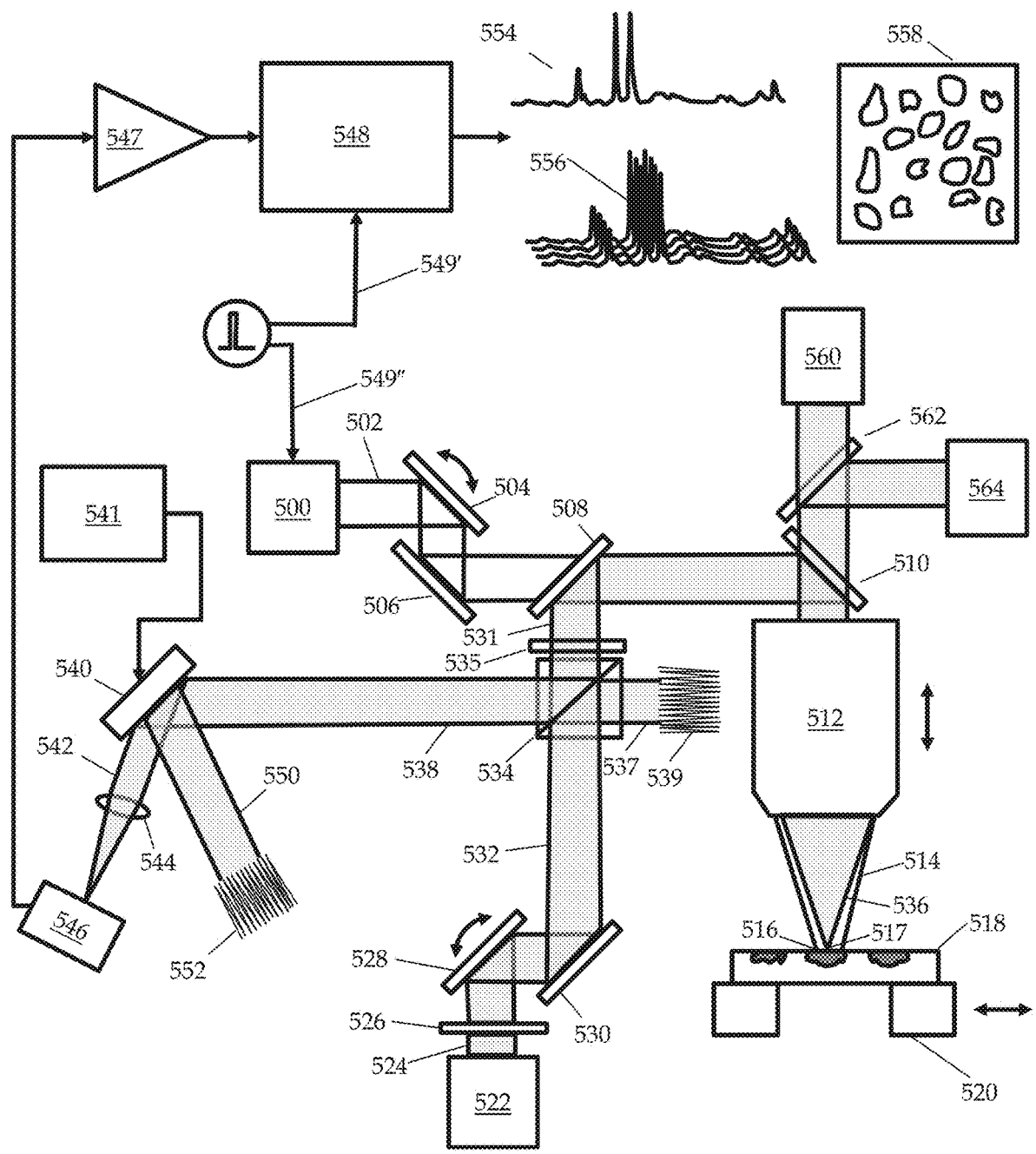
FIG. 5 is a simplified schematic diagram of an OPTIR system employing a spatial light manipulator and a pattern generator to optimize the measurement of IR absorption.

FIG. 5 shows a more detailed simplified schematic diagram of an embodiment of the apparatus. In this embodiment an infrared (IR) light source 500 produces a beam of IR light 502 that is optionally directed by one or more mirrors 504 and 506 before passing through beam combiner 508 (typically a dichroic beam splitter although a polarizing beam splitter could also be employed). In the configuration shown, the beam combiner 508 is substantially transmissive to IR radiation and reflective to probe radiation, thus the IR beam passes to dichroic 510. The beam combiner can alternately be reflective to IR and transmissive to probe light, and the configuration can be adjusted accordingly. Dichroic 510 reflects IR light to focusing element 512 to focus a beam of IR radiation 514 onto a region 516 of a sample 518. The sample may be mounted on a translation stage and/or scanner 520 to change the position of the sample 518 relative to the focus IR beam 514. A Probe source 522 generates a beam 524 of ultraviolet and/or visible light. The probe beam 524 passes through optional half wave plate 526 to optical mirrors 528 and 530. After the optional mirrors 528 and 530, the redirected probe beam 532 passes to beam splitter 534 where at least a portion of the probe beam strikes beam combiner 508. In one configuration, beamsplitter 534 is a polarizing beamsplitter cube. In this case, a half wave plate 526 and quarter waveplate 535 (or other polarization altering elements) can be employed to optimally separate incident and reflected light along two different paths. These polarization altering elements can also be used to control the amount of probe light directed on the sample 518. For example, a polarized beam 524 can have its polarization rotated such that the beam can be arbitrarily split by polarizing beamsplitter cube 534 into transmitted beam 531 and reflected beam 537 into beam dump 539, in embodiments.

Similarly, the outgoing (detector) path that includes the light reflected from the sample 518 will pass back through focusing device 512, reflect off mirror 510 and combiner 508 (which also functions as a mirror). A quarter wave plate 535 controls the amount of light that is reflected into path 538 towards detector 546.

In the configuration shown, the probe light 532 is reflected to the right by beam combiner 508, to dichroic 510, and then to focusing optic 512. Focusing optic 512 focuses a probe beam 536 into a focused spot 517 of the sample 518, generally at least partially overlapping with the focused spot 516 of IR beam 514. In alternate configurations, the IR and probe beams can be delivered to the sample be separate focusing optics. In other embodiments the probe beam may be adjacent to, but not actually overlapping IR illuminated region. At least one of mirrors 504, 506, 528, and 530 is preferably electronically controllable to adjust and optimize the overlap of focused IR and probe light beams 514 and 536. The overlap need not be symmetric or one centered on the other. By arranging the focused probe beam spot 517 to be off center of the IR spot 516, a gradient of IR may provide improved signal due to effects including surface slope to maximize vignetting (and thus attenuation) of the return (outgoing) beam.

Probe light reflected or scattered from the sample can be collected by a collecting optic or "collector." The collector may comprise focusing optic 512, i.e. the same optic can be used to illuminate the sample and collect light from the sample. To achieve high spatial resolution, it is desirable that the collector have a high numerical aperture. For example, the collector may comprise an objective with a numerical aperture of at least 0.4, or more preferably greater than 0.6. In one embodiment, the collector is a Cassegrain style reflective objective with 40× magnification and with an NA of 0.78. In another embodiment, the collector is a Cassegrain objective with 20× magnification and an NA of 0.70. The arrangement in FIG. 2 has a significant advantage in that it allows the collection of specularly reflected light, as well as all scattered light within the numerical aperture cone of the collector.

Alternately probe light that is reflected, transmitted, scattered or otherwise interacted with the sample can be collected by other collection optics, not shown. For samples that are transparent to the probe light, another collection objective may be placed below the sample to collect probe light transmission.

In the reflection configuration shown in FIG. 5, collected probe light is then reflected by filter/mirror 510, to beam combiner 508 and back to beam splitter 534. As mentioned previously, beam splitter 534 may be a polarizing beam splitter to maximize the amount of return light that reflected onto the detector path. In any case, beam splitter 534 reflects at least a portion of collected probe towards spatial light manipulator (SLM) 540. In a transmission configuration (not shown) collected probe light can be directed towards an SLM without the need for a beams splitter to separate incident and return probe light.

A pattern generator 541 generates a pattern of pixels on SLM 540 to set some pixels in the "on state" and some pixels in the "off state." The pattern generator can use any form of digital and/or analog electronics and any necessary amplifier to address the pixels of the SLM and set them into a desired state. For example, the pattern generator may be a video driver, a personal computer, and/or a single board computer, an embedded controller, an I2C board, or any similar device capable of generating an array of control signals or other commands to set the pixel state of the SLM.

Depending on the pattern of on/off state pixels, spatial light manipulator 540 splits collected probe light into one of at least two paths. For example, the SLM pixels set in the on state can be arranged to send the portion 542 of beam 538 on the path towards detector 546, optionally focused by one or more focusing optics 544. The spatial light manipulator 540 can optionally direct a second portion 550 of probe beam 538 away from detector 546, i.e. corresponding to SLM pixels that are in the off state. The portion of the beam 550 can be directed by SLM pixels in the off state for example to a beam dump 552 or other area where light on the second path does not strike detector 546. Note that the on/off state designations are arbitrary and the apparatus would work equally well if the logic was reversed, e.g. if the SLM off state directed light to the detector path and the on stage directed light to the beam dump, depending on the feature of interest being improved and the pixels corresponding to the most precise determination of that feature. Multiple spatial light manipulators can also be employed, as discussed in FIG. 6 below.

The spatial light manipulator may employ one or more technologies, for example it may be a digital micromirror device, liquid crystal on silicon (LCOS) device, a twisted nematic liquid crystal display (TN-LCD), Ferroelectric Liquid Crystal on Silicon (FLCoS) device or employ any other technology that enables setting of pixels into two or more different states. The spatial light manipulators may be on/off only or may employ gray scale levels to permit variable transmission reflection, and or attenuation of different portions of the beam.

Detector 546 generally generates an electrical signal in response to light striking its surface, for example a photocurrent or a photovoltage, or alternately a change in conductivity, resistance or other response indicative of the amount of detected light. The detector's photoresponse can be amplified and/or conditioned by one or more amplifiers and/or signal conditioning stages 547 that can provide amplification, filtering, bandwidth limitation, etc., as desired. The amplifier/signal conditioning can have variable gain to adjust to the detected light level and to maximize the dynamic range for the signal level for a given sample measurement. The bandwidth and/or gain profile may also be adjusted to compensate for the frequency content of the signal, for example related to the repetition rate of the IR source and/or the temporal dynamics of the photothermal response of the sample and/or attenuation of higher frequency laser noise.

The amplified/conditioned detector signal can then be passed to demodulator 548 which analyzes the detector signal to create a signal indicative of the modulation of the detector signal as a function of IR absorption by the sample. Demodulator 548 can, for example, be a lock-in amplifier, where a reference signal 549' is the same as or synchronous with the timing characteristics as the pulse signal 549" supplied to the IR source. Depending on the demodulator, the same pulse signal 549" can serve as a reference to the demodulator. The demodulator may also be a digital algorithm running on a digital signal processor (DSP), a field programmable gate array (FPGA), any other sort of embedded processor, a single board computer (like a Raspberry PI or a Beagle Bone Black for example), or a personal computer or any similar digital computation means, including cloud resources (remote computers accessed through the internet). The demodulator can work in a frequency domain, for example implementing a lock-in or Fast Fourier Transform algorithm, and/or it can operate with a time domain calculation. For example, a time domain calculation can determine the average or integrated signal level during an IR laser pulse and compare it to the signal level when the IR pulse is absent.

In any of these cases, the demodulator 548 analyzes the signal from one or more photodetectors and produces a signal indicative of the strength of IR absorption by the sample. The IR absorption signal can be measured as a function of wavelength or equivalently wavenumber of the IR source to produce an IR absorption spectrum 554. The spectrum can have a series of peaks that correspond to molecular vibrations of one or more components of the sample, thus permitting chemical characterization, analysis, and/or identification of one or more chemical components of the sample. Measurements of IR spectra can be performed at a plurality of locations of the sample, for example by translating sample 518 via sample stage 520, to produce an array of IR spectra 556. These spectra can be measured at arbitrary user selected points on the sample, in a linear array, e.g. across an interface between two materials, and/or in a 2D array to create a hyperspectral data cube indicating IR absorption versus wavelength and sample position. The hyperspectral array may be analyzed at one or more wavelengths to create a map 558 indicative of the distribution of different chemical components within the sample. Alternately the composition map 558 may be generated by tuning IR source 500 to one or more desired central wavelengths.

Optional camera 560 can provide a visual image of the sample to select a location of interest on the sample, i.e. the position of focused probe spot 517. Filter/mirror 510 can be selected to be a dichroic filter that reflects IR and visible light corresponding to the wavelengths of IR source 500 and probe beam source 522, but sufficiently transparent to permit at least a portion of light from illuminator 564 to get to the sample and back to reach camera 560. Alternately, filter/mirror 510 can be a movable/exchangeable element. For example, filter/mirror 510 can be a purely reflective mirror for measurements of IR absorption, and can be exchanged for a beam splitter or even a transparent window (or no window) for sample alignment purposes. Multiple reflector/filter configurations can be coated onto one substrate and the substrate can be translated or rotated across the beam to select the desired filter/mirror for a given situation. Arranging filter/mirror 510 to have at least one beam splitter can be advantageous as it can allow an imaging of the focused beam spot on the sample onto the camera. Enabling a real-time view of the focused probe beam spot can ensure rapid and accurate focusing and positioning of the focused probe spot, ensuring optimal signal, optimal spatial resolution, and accurate positioning of the sample region of interest under the IR and probe focused spots. Camera illumination can be provided by illuminator 564 in combination with beam splitter 562. Beamsplitter 562 and/or camera 560 may also contain an optional laser filter (such as a notch filter) to reduce the intensity of probe light reaching the camera sensor so as not to overwhelm the camera sensor. In some configurations mirror/filter 510 and beam splitter 562 can be combined into a single element or a single optomechanical assembly. One can also take advantage of polarization differences between illuminator 564 and laser 522. Simultaneous viewing can also allow for IR alignment relative to the probe beam by observing damage created by excessive IR. In alternate embodiments, the source of IR radiation can instead or additionally supply other wavelengths of radiation, for example near IR and/or terahertz radiation.

Figure 6:
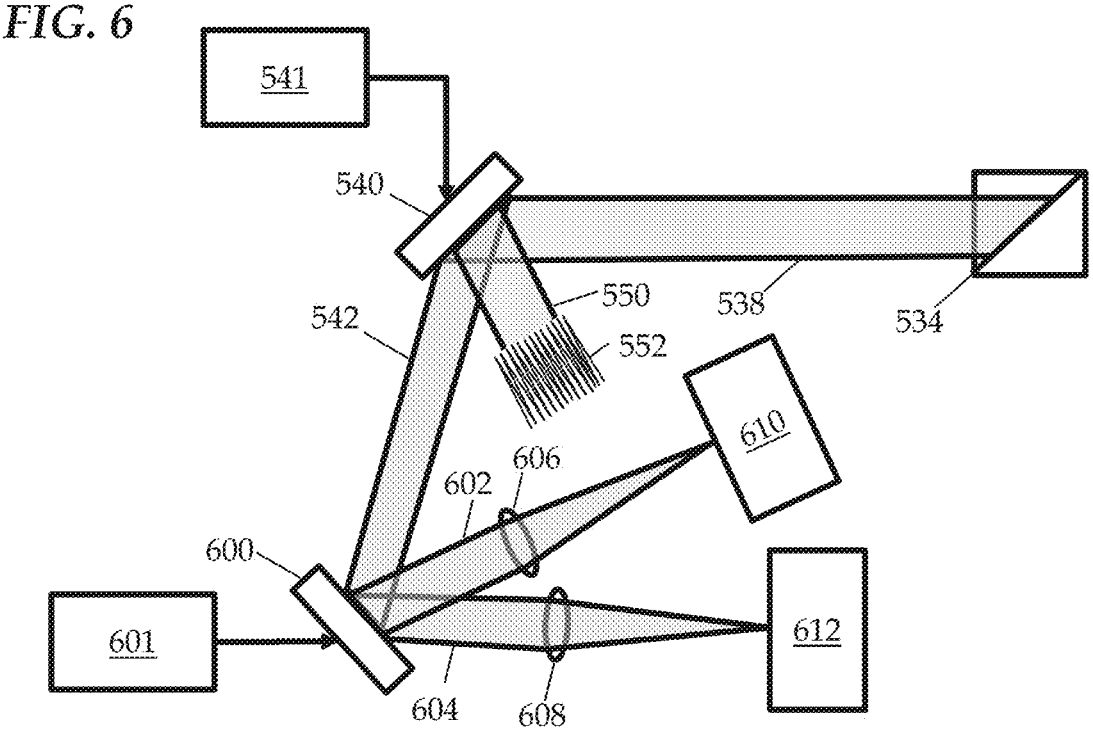
FIG. 6 is a simplified schematic diagram of a portion of an OPTIR system employing two spatial light manipulators.

FIG. 6 shows an alternate embodiment of the apparatus in FIG. 5, in this case using two spatial light manipulators (SLMs). FIG. 6 shows a modified portion of FIG. 5 with attention to the return beam on the detector path. Note that beam splitter 534 in FIG. 6 is the same as beam splitter 534 in FIG. 5. As in FIG. 5, beam 538 that is reflected by beam splitter 534 is directed towards first SLM 540 that divides beam 538 onto to different paths based on a selectable pixel pattern, as described in association with FIG. 4. The portion of beam 538 that is most associated with unchanging or little changing probe light is directed off SLM 540 onto path 550 that is directed away from any active detector, e.g. towards beam dump 552. The portion of light that does contain substantial information about IR absorption by the sample is directed on a separate path 542 towards a second SLM 600. The second SLM 600 can be used in combination with second pattern generator 601 to divide beam 542 into different beams 602 and 604 based on the sign or phase of the change in intensity versus sample IR absorption. Note that second pattern generator 601 may be a completely separate unit or it may be a separate output channel or sub-component of pattern generator 541. As mentioned above, some portions of the beam 542 increase in intensity with sample IR absorption whereas other regions decrease in intensity. SLM pixels corresponding to a positive change in intensity, for example, can be sent along path 602, whereas pixels corresponding to s negative change in intensity can be directed to path 604. Both beams 602 and 604 can then be optionally focused via lenses 606 and 608 or other focusing optics onto the surfaces of detectors 610 and 612. Detectors 610 and 612 can be completely discrete and separate photodetectors or they can be elements of a matched detector pair, and/or elements within a multi-element array. For example, they could be adjacent elements in a 2 element (or lateral effect diode) or 4 element (quadrant) photodetector array. Multi-element arrays can also be used to simultaneously determined brightness and angle changes between the two beams 604 and 602.

Figure 7:
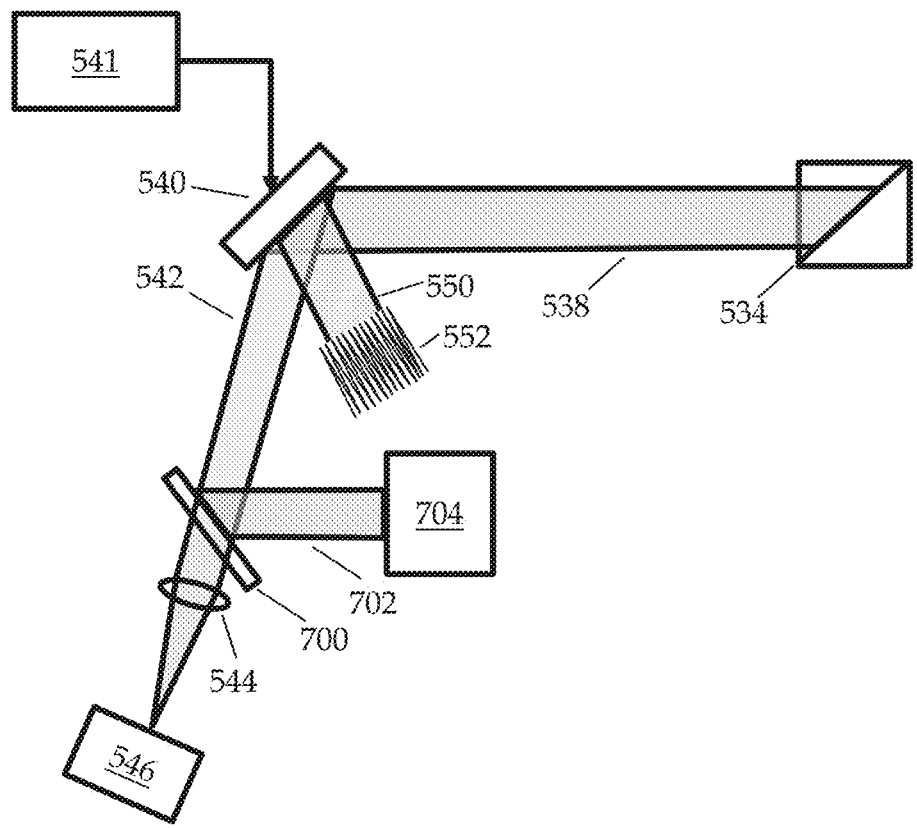
FIG. 7 is a simplified schematic diagram of a portion of an OPTIR system employing a camera to determine the distribution of photothermal response within a collected probe beam.

FIG. 7 shows an alternate embodiment of the apparatus in FIG. 5. As with FIG. 6, FIG. 7 shows a portion of the apparatus in FIG. 5, starting with beam splitter 534 and the probe beam 538 that is reflected onto the detector path. As in FIG. 5 and FIG. 6, beam 538 is directed towards SLM 540 which can direct individual portions of beam 538 onto one of two different paths, 542 and 550. On beam path 542, a removable or movable mirror 700 can be inserted into the beam to direct at least a fraction of the light 702 onto a camera. Additional optics not shown may be used to magnify/demagnify and/or filter the beam as needed such that it provides a suitable image of the probe beam.

This camera can then be used to determine which portions of the beam are highly sensitive to sample IR absorption, as well as the sign of the intensity change for different regions of the beam. At the start of the process, all pixels in SLM 540 are set to direct the beam along path 542, with none of the beam being directed on the path 550 towards the beam bump. Then camera frames can be acquired under two conditions, (a) with the IR laser on, and (b) with the IR laser off. These IR on/IR off frames can be analyzed to determine which pixels change in intensity as a function of sample IR absorption, as well as the sign of the change, i.e. increasing or decreasing in pixel intensity with IR absorption. For improved sensitivity, the camera can be triggered and exposed in sync with the IR pulses, i.e. to capture signal frames just when the IR source is being pulsed and/or for the period of time that the sample is undergoing a photothermal response to the IR absorption. By analyzing the increases and decreases in pixel intensity with IR absorption, a pixel pattern can be created for the camera that identifies the regions of the beam that are most sensitive to IR absorption, as well as the sign of the pixel change.

This camera pixel pattern can be readily transferred to an SLM pixel pattern via an appropriate calibration process between the pixels of the camera and the SLM. For example, individual pixels of SLM 540 can be turned off, i.e., sending those pixels to path 550 away from the camera. By monitoring which corresponding pixels go dark in the frame of camera 704, it is possible to determine the scale, rotation, and offset between the camera pixels and the SLM pixels. A full coordinate mapping can be created between the camera and the SLM such that the probe light distribution patterns on the camera can be rapidly loaded into the SLM pattern. The use of the camera can make the optimization of the SLM pattern be rapid, dynamic, and fully automatable. The scheme of FIG. 7 can also be used in combination with the two SLM scheme of FIG. 6. In this case, for example the removable mirror 700 and camera 704 could be placed after the second SLM 600. In this case the optimal patterns for both the first SLM 540 and second SLM 600 can be rapidly determined. Mirror 700 could be replaced with a beam splitting device (such as a window, beam sampling grating, polarizing beam splitter, etc. which provides a continuous view along beam 542. The amount of light and the image plane viewed can be alterable with additional optical, electro-optical, and opto-mechanical devices.

Alternate Schemes for SLM Pattern Optimization

The SLM pixel pattern may also be generated in a number of other different ways. As mentioned above, the pattern may comprise relatively simple shapes that can be parameterized, for example a central obscuration and an outer iris. In this case the parameter values, e.g. the radii of the obscuration and the iris may be dynamically adjusted while monitoring a signal indicative of the sensitivity and/or signal to noise ratio of the IR absorption signal. The radii can then be adjusted to improve or substantially maximize any desired figure of merit, i.e. to substantially maximize the signal and substantially minimize the minimally changing background/noise. Arbitrary parametric shapes can be employed, and their effectiveness can be rapidly determined.

It is also possible to optimize the sensitivity/SNR on a pixel by pixel basis. For example, the entire SLM array can be swept turning on one pixel at a time and determining the fraction that each pixel adds to the signal and to the noise of the measurement. A threshold can be set to determine whether the pixel should be included or excluded from (e.g. on state or off state) from the pattern of pixels reflecting light onto a detector path. All pixels with a signal contribution above the designated threshold can be set to the on state to direct probe light from the high signal content regions to a detector. All pixels with a lower signal content and/or high background/noise contribution can be directed away from a detector path.

Machine learning algorithms can also be used to determine the optimal SLM patterns. For example, various regression techniques, discriminant analysis, cluster and tree techniques, Bayes classifiers, genetic algorithms, and/or other related techniques can be used to identify the clusters of SLM pixels that contribute substantially to IR absorption signal versus contributing to background or noise. Recursive techniques can be applied to start with an initial SLM pattern guess and then iteratively alter the pattern while monitoring if the SNR or other metric is getting better or worse. For example, a genetic algorithm can be used starting with a seed pattern and then evolving the pattern over multiple iterations (generations) until a desired figure of merit is achieved. The generation of the pattern can be done either on a known reference sample and then applied to other unknown samples, or a new pattern can be generated for each new sample. In this case, the seed pattern can be a pattern generated on a reference sample and/or the last, best pattern.

Figure 8:
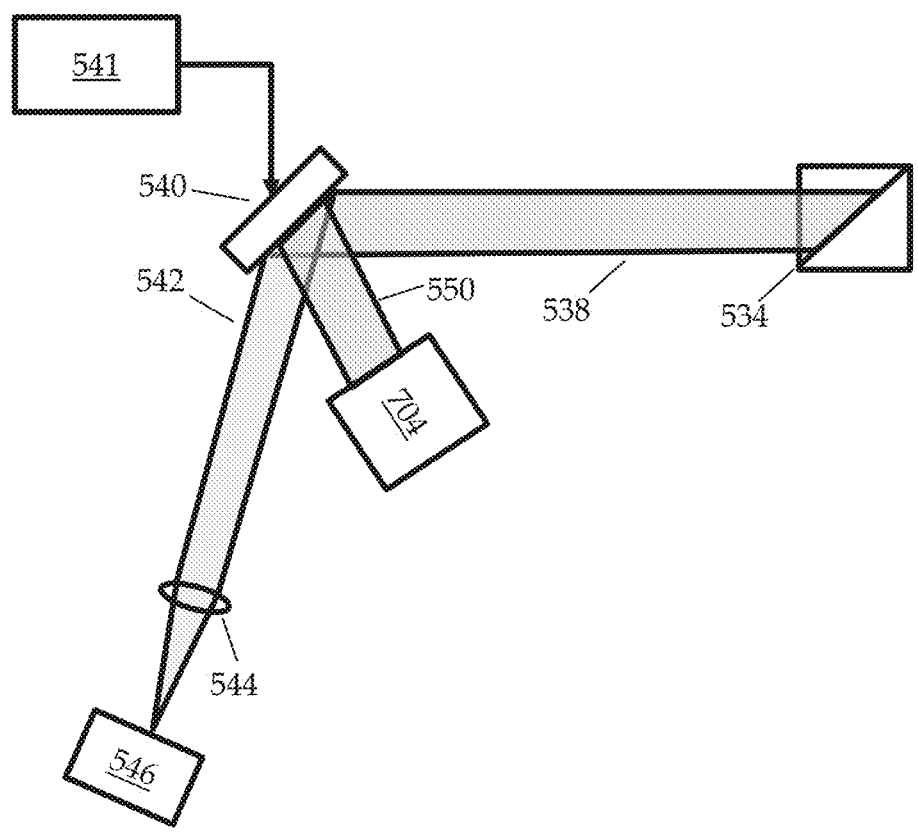
FIG. 8 shows an alternate embodiment of OPTIR configurations shown in FIG. 5 and FIG. 7.

One example of an alternate embodiment of an OPTIR configuration is shown in FIG. 8. Common elements between FIGS. 5 and 7 use the same reference numbers, and associated descriptions apply as appropriate. In FIG. 8, the camera 704 is moved to replace the beam dump 552 in FIGS. 5 and 7. Placing the camera 704 at this location is advantageous as it allows visualization of the collected probe beam 538 without the need for a beamsplitter 700 shown in FIG. 7. When it is desired to visualize the collected probe beam 538, the SLM 540 can be set such that all pixels direct the collected probe beam to path 550 towards the camera. The camera images can then be used to construct an optimal pattern for the SLM 540 to direct a selected portion of the collected probe beam to detector 546 via path 542. Camera 704 can also be used in real time to visualize/measure/adjust the effect of a pattern applied to SLM 540, as light directed along path 550 will directly show the shape of any obscuration or other beam blocking applied to SLM 540.

Figure 9:
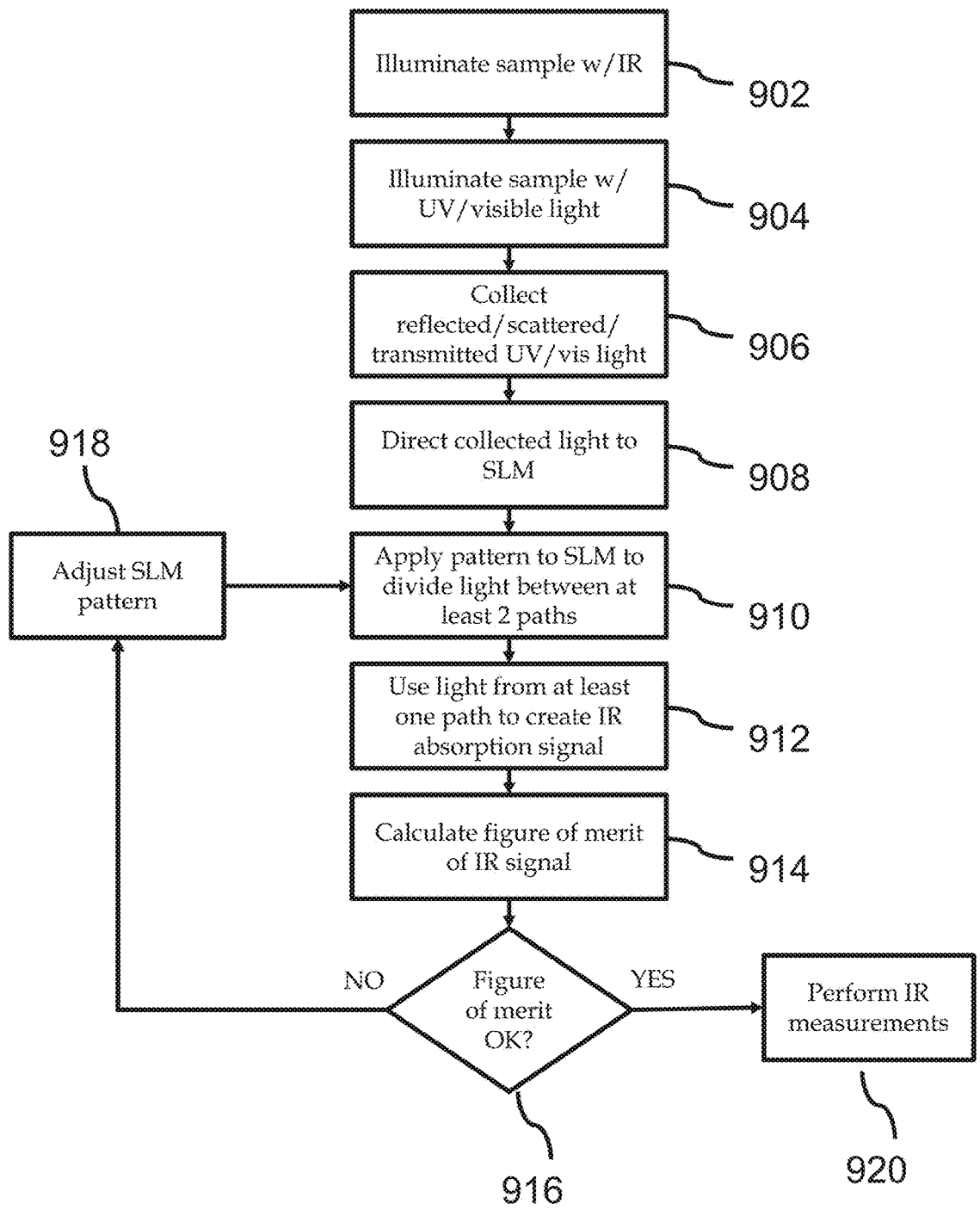
FIG. 9 shows a simplified method for performing an OPTIR measurement with a spatial light manipulator.

FIG. 9 is a flowchart showing a method for operating an OPTIR system such as those described above. At 902, a sample is illuminated with an infrared source. At 904, the sample is illuminated with a UV/visible light source. As described above, the illumination at 902 and 904 can be simultaneous or sequential, and can include illumination at a common or similar location such that the deflection of the UV/visible light is indicative of heating of a sample caused by the interaction with the IR beam produced at 902. Thus, while 902 and 904 are shown as occurring sequentially in FIG. 9, it should be understood that they are not necessarily conducted strictly sequentially.

At 906, reflected, scattered, or transmitted probe light is collected (depending on the configuration of the sample as described in more detail above). At 908, the collected light is sent to the SLM. At 910, a pattern is applied to the SLM to divide light between at least two paths, in order to improve a feature of merit. The light from the at least one path that has an improved signal-to-noise ratio is used to create an IR absorption signal at 912. At 914, the feature of merit of the IR signal is calculated (although this step may not be necessary in all embodiments, once the system is sufficiently calibrated).

At 916, the feature of merit can be compared to a predetermined threshold. If the threshold is not sufficiently high, the pattern applied by the SLM can be adjusted at 918. This process can be iterated, for example using manual, iterative, or machine learning systems to improve the figure of merit detected at 916. Once the figure of merit meets the desired threshold, IR measurements are conducted 920.

Figure 10:
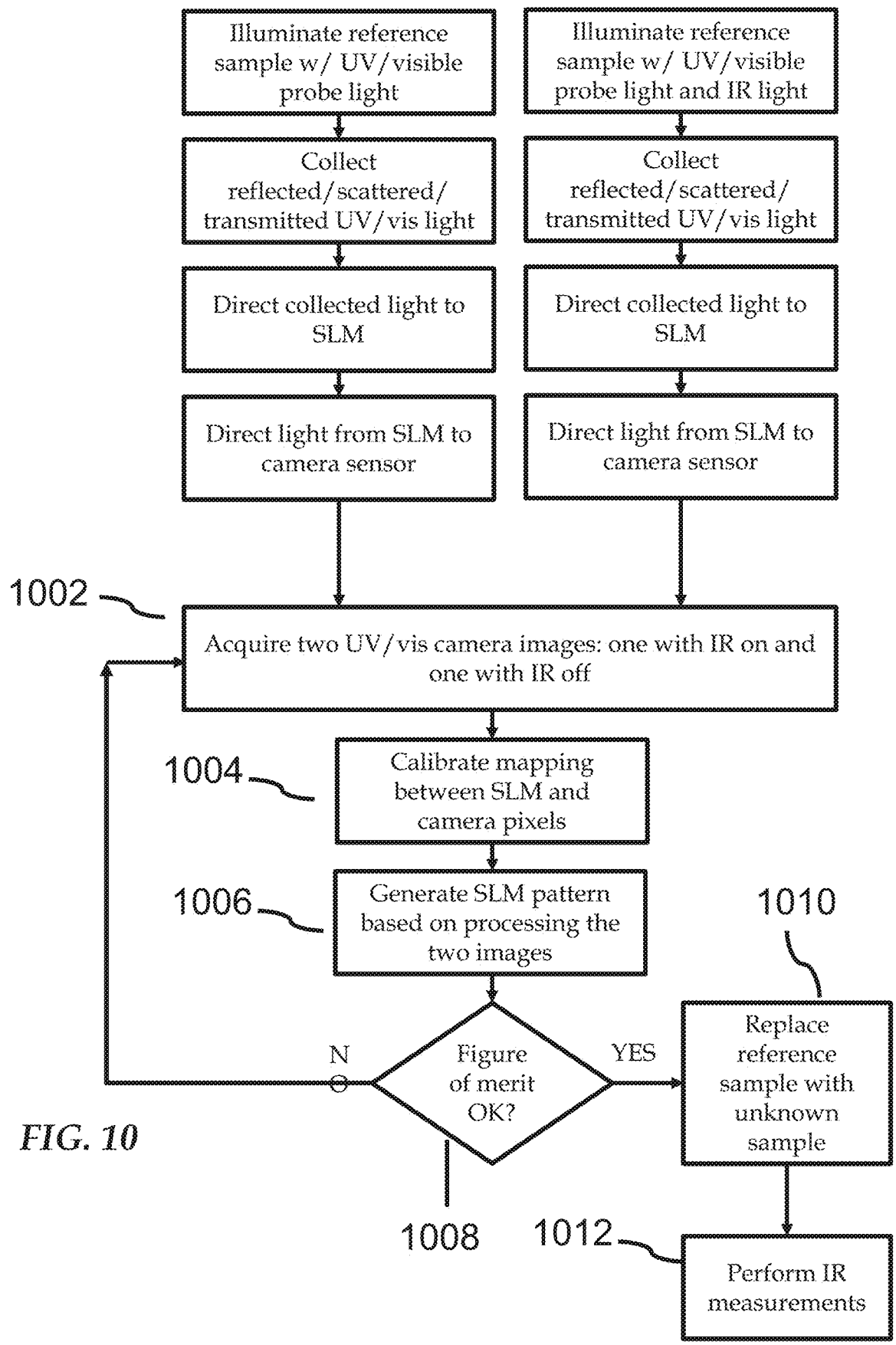
FIG. 10 shows a simplified method for determining a pattern for a spatial light manipulator in an OPTIR system.

FIG. 10 is an alternative embodiment in which two UV/vis camera images are detected in parallel, one with the IR source off and one with the IR source on, at 1002. Each of the cameras detects images of a known material. At 1004, a mapping is conducted between the SLM and camera pixels. At 1006, an SLM pattern is generated based on processing the two images. At 1008, if the figure of merit does not yet meet a predetermined threshold then the process is iterated, as previously described with respect to FIG. 9. Alternatively, if the figure of merit meets the desired threshold, then the reference sample is replaced with a sample of an unknown material at 1010, and IR measurements are performed at 1012.

Figure 11:
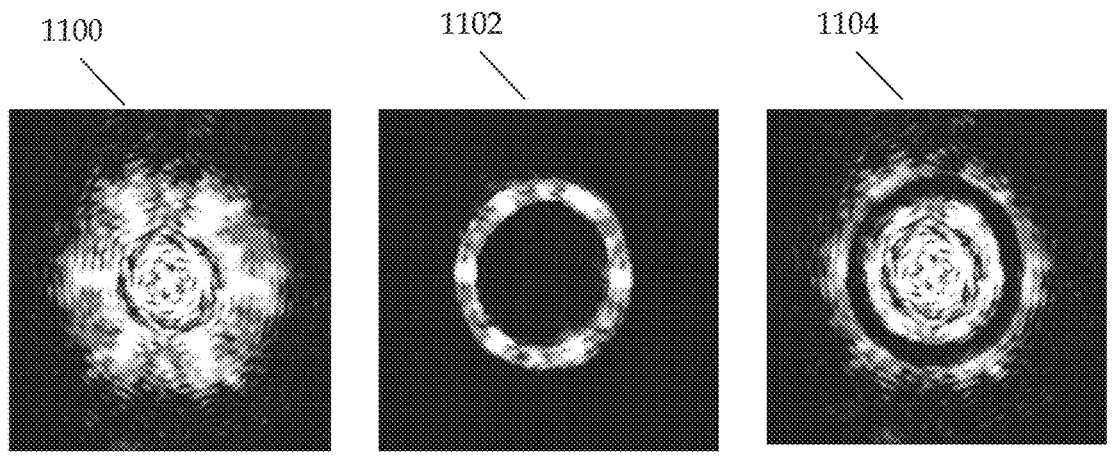
FIG. 11 shows an example of a pattern applied to an SLM according to an embodiment.

FIG. 11 shows an example of a pattern applied to an SLM under the embodiment of FIG. 7. First image 1100 is an image captured by camera 704 with no pattern applied to the SLM 540, i.e. the full collected probe beam is directed towards camera 704. Image 1102 shows an annular subset of the collected probe beam identified as high sensitivity to photothermal measurements. Image 1104 shows the image on the camera 704 when a pattern is applied to SLM 540 corresponding to the annular region in image 1102. In image 1104, the dark annular region appearing in the camera image illustrates the region of the collected probe beam that is instead directed towards detector 546.

Figure 12:
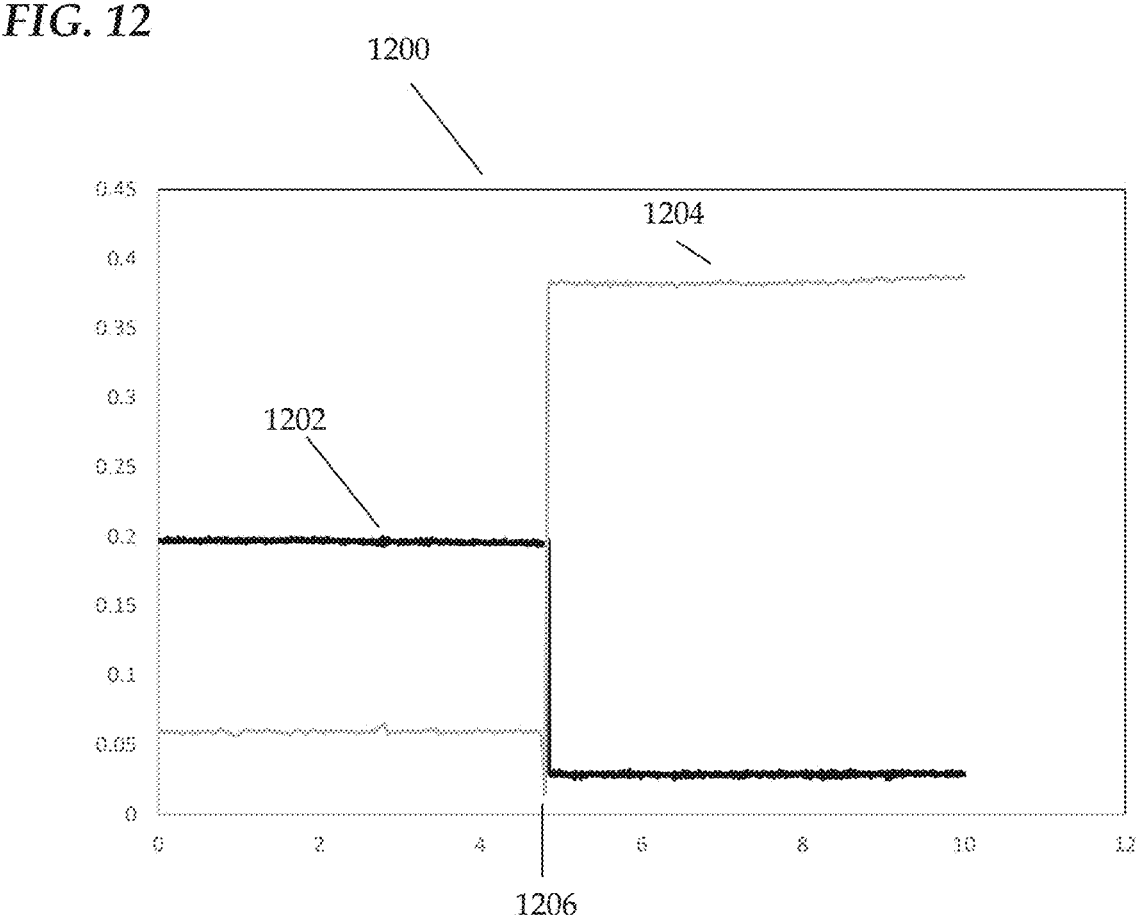
FIG. 12 depicts an improvement in sensitivity and signal-to-noise ratio using embodiments described herein.

FIG. 12 shows an example of the dramatic sensitivity and SNR improvement achievable using embodiments described herein. For the measurement shown, and OPTIR measurement was performed under the embodiment shown in FIG. 5, with the SLM/camera/detector configuration shown in FIG. 8, and using an annular SLM pattern similar to that described in FIG. 10 above. The IR source was a QCL laser pulsed at 45 kHz and the modulation amplitude of the collected probe light was synchronously detected with a lock-in amplifier. FIG. 12 includes a plot 1200 that shows the DC intensity of probe light collected (signal 1202) and the lock-in amplitude (signal 1204) as a function of time. The DC intensity is measured in volts and the lock-in amplitude is in mV. At the time start of the measurement, the SLM is in a configuration where all collected probe light is directed towards the detector, i.e. equivalent to a prior configuration with no masking applied. At marker 1206, an annular pattern was applied to the SLM 540 as described associated with FIG. 11. After the SLM pattern is applied at point 1206, the DC intensity of the detected probe light drops by a factor of 6.7×, whereas the lock-in amplitude increases by 6.3×. In the typical OPTIR operating regime where the collected light is well above the detector noise floor, we have observed that the lock-in noise is proportional to the laser noise which is in turn is roughly a fixed percentage of the collected probe light. When the collected light is decreased by 6.7×, the lock-in noise decreases roughly by the same factor. Thus the embodiments shown can provide OPTIR sensitivity improvements of at least 6.3× and SNR improvements of at least 6.7×6.3=42×. This was achieved using a single elliptical shaped obscuration pattern on the SLM. Even higher SNR improvements are possible with more complex SLM patterns.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical elements, control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An apparatus for rapidly characterizing a sample with infrared radiation on a submicron scale, the apparatus comprising:
   a source of infrared radiation configured to illuminate a sample with a beam of infrared radiation to create an infrared illuminated area;
   a source of probe radiation configured to illuminate a sample with a beam of probe radiation to create a probe illuminated area;
   a collector configured to collect as collected probe light at least a portion of probe radiation that has interacted with the sample;
   at least one detector configured to detect as detected probe light at least a portion of collected probe light and generate at least one detector signal indicative of the portion of collected probe light;
   at least one spatial light manipulator configured to alter a distribution of collected probe light incident on the at least one detector, wherein the at least one detector signal is used to generate a signal indicative of an absorption of infrared radiation of at least a portion of the region of the infrared illuminated area;
   wherein the source of infrared radiation and the source of probe radiation are configured such that the infrared illuminated area can interact with a sample to affect the detected probe light, and
   wherein the at least one spatial light manipulator is configured to improve a figure of merit of the signal indicative of infrared absorption.

2. The apparatus of claim 1, wherein the figure of merit of the signal indicative of infrared absorption is a detection sensitivity measurement of the at least one detector signal in response to the distribution of collected probe light due to a photothermal effect.

3. The apparatus of claim 2 wherein the figure of merit is at least one of: signal strength, noise level, background intensity, signal to noise ratio, and signal to background ratio.

4. The apparatus of claim 1, wherein individual pixels of the at least one spatial light manipulator are configured to be selected to direct the collected light to the receiver or to another location.

5. The apparatus of claim 4, wherein the individual pixels of the at least one spatial light manipulator are selected to be in a pattern to improve the figure of merit of the signal indicative of infrared absorption.

6. The apparatus of claim 1 further comprising a pattern generator, wherein the pattern generator is configured to generate a pattern on the at least one spatial light manipulator that sets a first array of pixels in a first state and a second array of pixels in one or more different state.

7. The apparatus of claim 6 wherein the pattern generator is coupled to a processor configured to dynamically adjust the pattern to substantially optimize the figure of merit of the signal indicative of infrared absorption.

8. The apparatus of claim 6 wherein the pattern comprises at least one of: an aperture, a central obscuration, an annulus, an obscuration characterized by a first diameter and an iris characterized by a second diameter, and a bullseye pattern.

9. The apparatus of claim 6 wherein the pattern generator is configured to scan at least a plurality of pixels of the spatial light manipulator between states to determine which pixels substantially contribute noise and/or background contributions to the signal indicative of infrared absorption.

10. The apparatus of claim 6 wherein the pattern generator is configured to generate a pattern that substantially maximizes a signal to noise ratio of the signal indicative of infrared absorption.

11. The apparatus of claim 1, wherein the at least one spatial light manipulator is at least one of: a digital micromirror device, liquid crystal on silicon (LCOS) device, a twisted nematic liquid crystal display (TN-LCD), Ferroelectric Liquid Crystal on Silicon (FLCoS).

12. The apparatus of claim 1, wherein the at least one spatial light manipulator is configured to operate in reflection mode.

13. The apparatus of claim 1, wherein the at least one spatial light manipulator is configured to operate in transmission mode.

14. The apparatus of claim 1, comprising at least two spatial light manipulators, wherein a first spatial light manipulator is used to split collected light into signal light and background light and wherein a second spatial light manipulator is used to split signal light between two or more detectors for differential measurements or movement of light within the image plane of the SLM.

15. The apparatus of claim 1 further comprising a camera that samples at least a portion of the collected probe light, wherein images from the camera are processed to generate a pattern of different states for individual pixels of the spatial light manipulator.

16. A method of operating a system for rapidly characterizing a sample with infrared radiation on a microscopic scale, the method comprising the steps of:
   illuminating a sample with a source of infrared radiation to create an infrared illuminated spot on the sample;
   illuminating the sample with a source of probe radiation configured to produce a focused probe beam spot on the sample that at least partially overlaps the IR illuminated spot;
   collecting at least a portion of probe light after interaction with the sample;
   routing at least a portion of the collected probe light to at least one detector using a spatial light manipulator to alter a distribution of collected probe light incident on the at least one detector; and
   analyzing probe light detected by the at least one detector to generate a signal indicative of an infrared absorption of the region of the sample illuminated by the probe beam spot,
   wherein using the spatial light manipulator is configured to improve a figure of merit of the signal indicative of infrared absorption.

17. The method of claim 16 further comprising the step of generating a pattern of pixel states for the spatial light manipulator.

18. The method of claim 17 further comprising of adjusting the pattern to improve the figure of merit for the signal indicative of IR absorption of the sample.

19. The method of claim 18 wherein the pattern is at least one parametric shape and the step of adjusting the pattern comprises changing at least one parameter of the parametric shape.

20. The method of claim 18 wherein the step of adjusting the pattern to improve the figure of merit is performed via a machine learning process.

21. The method of claim 18 wherein the step of adjusting the pattern to improve the figure of merit is performed automatically.

22. The method of claim 16 further comprising the step of directing at least a portion of the collected probe light to a second spatial light manipulator.

23. The method of claim 16 wherein the spatial light manipulator divides the probe light beam into two sub-beams with substantially different phase responses to absorption of IR light by the sample.

24. The method of claim 23 further comprising the step of directing the two sub-beams to at least two different detectors.

25. The method of claim 24 further comprising the step of generating a signal indicative of IR absorption by the sample based on light detected by at least two different detectors.

26. The method of claim 25 further comprising the step of generating a pattern of state pixels on the spatial light manipulator.

27. The method of claim 26 wherein adjusting the pattern of state pixels of the spatial light manipulator improves the figure of merit of a signal indicative of IR absorption of the sample.

28. The method of claim 23 wherein the first spatial light manipulator is used to divide the collected probe light into a signal beam and a background beam and the second spatial light manipulator is used to divide the collected probe light into two sub-beams with substantially opposite phase responses to absorption of IR light by the sample.

29. An apparatus for rapidly characterizing a sample with infrared radiation on a submicron scale, the apparatus comprising:
  a first source of radiation configured to illuminate a sample with a beam of infrared radiation to create a first illuminated area, wherein the first source of radiation emits radiation comprising at least one wavelength within the range from infrared to terahertz;
  a source of probe radiation configured to illuminate at least a region at least partially overlapping the first illuminated area of the sample with a beam of probe radiation;
  a collector configured to collect as collected light at least a portion of the probe radiation that is at least one of scattered, refracted, aberrated, diverted, diffracted, transmitted, and reflected from the sample;
  at least one spatial light manipulator configured to direct at least a portion of the collected light to a detector, wherein the detector is configured to analyze the collected light to generate a signal indicative of an absorption of radiation of from the first source of radiation of at least a portion of the region of the first illuminated area and the at least one spatial light manipulator is configured to improve a detection sensitivity measurement of the signal indicative of absorption.

30. An apparatus for rapidly characterizing a sample with infrared radiation on a submicron scale, the apparatus comprising:
  a source of infrared radiation;
  a source of probe radiation;
  a collector configured to collect probe light that has interacted with a region of the sample that has also interacted with the probe radiation;
  a spatial light manipulator configured to alter a distribution of collected probe light incident on a detector configured to detect at least a portion of collected probe light,
  wherein the source of infrared radiation and the source of probe radiation are configured such that the infrared illuminated area can interact with a sample to affect the detected probe light and the at least one spatial light manipulator is configured to improve a detection sensitivity measurement of a signal generated by the detector.

* * * * *